(12) United States Patent
Baird

(10) Patent No.: US 12,029,207 B1
(45) Date of Patent: Jul. 9, 2024

(54) FISHING LINE CONNECTOR

(71) Applicant: Joseph A Baird, Highlands Ranch, CO (US)

(72) Inventor: Joseph A Baird, Highlands Ranch, CO (US)

( * ) Notice: Subject to any disclaimer, the term of this patent is extended or adjusted under 35 U.S.C. 154(b) by 0 days.

(21) Appl. No.: 18/630,462

(22) Filed: Apr. 9, 2024

Related U.S. Application Data

(60) Provisional application No. 63/462,151, filed on Apr. 26, 2023.

(51) Int. Cl.
A01K 91/047 (2006.01)

(52) U.S. Cl.
CPC .................................. A01K 91/047 (2013.01)

(58) Field of Classification Search
CPC ..................................................... A01K 91/047
See application file for complete search history.

(56) References Cited

U.S. PATENT DOCUMENTS

| 867,162 | A |  | 9/1907 | Seidl |  |
|---|---|---|---|---|---|
| 1,199,690 | A |  | 9/1916 | Gillan |  |
| 3,023,535 | A |  | 3/1962 | Holka |  |
| 3,385,619 | A | * | 5/1968 | Thomas | A01K 91/047 289/1.5 |
| 3,540,091 | A |  | 11/1970 | Marosy |  |
| 3,661,411 | A |  | 5/1972 | Flick |  |
| 3,857,645 | A | * | 12/1974 | Klein | F16G 11/02 289/1.5 |
| 5,157,861 | A |  | 10/1992 | Peterson |  |
| 6,125,574 | A |  | 10/2000 | Ganaja |  |
| 6,591,461 | B2 |  | 7/2003 | Salentine |  |
| 6,880,289 | B1 | * | 4/2005 | Yin | A01K 91/047 403/353 |
| 8,276,311 | B2 |  | 10/2012 | Cowin |  |
| 10,258,116 | B2 |  | 4/2019 | Hashimoto |  |
| 2005/0034356 | A1 | * | 2/2005 | Blette | A01K 91/047 43/44.9 |
| 2005/0039376 | A1 | * | 2/2005 | Blette | A01K 91/047 43/43.1 |
| 2006/0016118 | A1 | * | 1/2006 | Zuk | A01K 85/18 43/43.12 |
| 2007/0227059 | A1 | * | 10/2007 | Cox | A01K 91/047 43/44.87 |

(Continued)

FOREIGN PATENT DOCUMENTS

| CA | 3173303 | A1 | * | 3/2024 | ........... A01K 91/047 |
| GB | 1406016 | A | * | 9/1975 | ............. A01K 91/04 |

(Continued)

Primary Examiner — Christopher P Ellis

(74) Attorney, Agent, or Firm — Leyendecker & Lemire, LLC

(57) ABSTRACT

A fishing line connector system is described that can be used in the field to change out a fly pretied to a tippet quickly and easily. The connector system comprises lightweight buoyant left and right halves that can be easily coupled and decoupled by way of a threaded connection. Each includes fishing line bores through which fishing line can be tied with one half typically being tied to a leader line and the other half to a tippet line. The connector system is brightly colored to permit an angler to see the connector floating on the surface of the water and thereby serve as an indicator as to general location of the fly.

20 Claims, 4 Drawing Sheets

(56) References Cited

U.S. PATENT DOCUMENTS

| | | |
|---|---|---|
| 2014/0250765 A1 | 9/2014 | Berchin-Miller |
| 2017/0188562 A1 | 7/2017 | Taylor |
| 2020/0120912 A1* | 4/2020 | Anthony, Jr. ........ A01K 91/047 |
| 2022/0151211 A1* | 5/2022 | Cure .................. A01K 85/1833 |

FOREIGN PATENT DOCUMENTS

| | | | | |
|---|---|---|---|---|
| GB | 2411560 A | * | 9/2005 | ........... A01K 91/047 |
| GB | 2443013 A | * | 4/2008 | ............. A01K 91/03 |
| GB | 2482484 A | * | 2/2012 | ............. A01K 91/03 |
| JP | 2010166828 A | * | 8/2010 | |
| JP | 2014233290 A | * | 12/2014 | |

\* cited by examiner

ND CONNECTOR

RELATED REFERENCES

This application claims priority to and incorporates fully by reference U.S. provisional patent application 63/462,151 filed Apr. 26, 2023 and having the same inventor and title as the present application.

BACKGROUND

When fly fishing, changing out one fly and its associated tippet for another fly and its associated tippet, which typically comprises tying the tippet to the leader, can be extremely challenging. Even the slightest hand movement can cause the small diameter and largely invisible tippet to move around. The lack of a flat surface, such as a top of a workbench or table, can make judging the relative spatial positioning of the tippet and leader ends challenging making tying the lines together even more difficult.

These problems are compounded often when the fisherman/angler is older or disabled. Anyone over 45 is likely to suffer from presbyopia challenging his/her ability to focus on the line ends without the use of reading or multifocal glasses. Other fisherman may suffer from an essential tremor or other malady in his/her hands substantially compounding the problem of tying a tippet to a leader.

While a fisherman can prepare his/her rig before heading out to a fishing spot attaching a fly that he/she believes the fish will be interested, it is often the case that the choice of fly is incorrect and he/she will have to try other flies in hopes of finding one that will cause the fish to bite. Nevertheless, without an easier means of changing out a fly, an angler might pass on enjoying the pastime especially as he/she ages to avoid the frustrations associated therewith.

DETAILED DESCRIPTION

Overview

Figure 1:
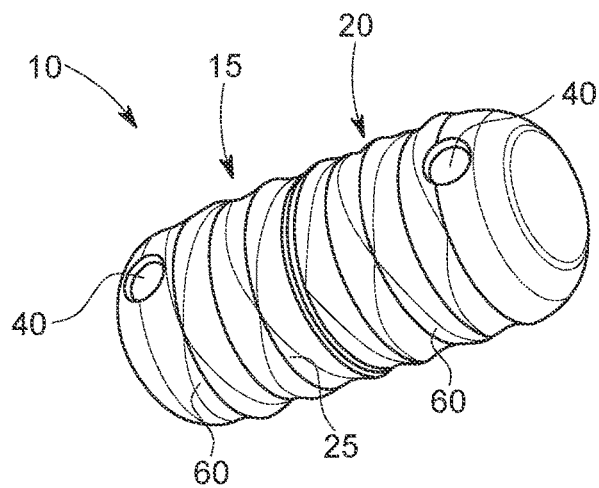
FIG. 1 is perspective view of a fly-fishing line connector with the halves of the connector joined together according to an embodiment of the present invention.

Embodiments of the present invention comprise a fishing line connector system that can be used in the field to change out a fly pretied to a tippet quickly and easily. Embodiments of the connector system comprise left and right halves that can be easily coupled and decoupled by way of a secure connection. Each half includes fishing line bores through which fishing line can be tied with one half typically being tied to a leader line and the other half to a tippet line.

Some embodiments of the connector are fabricated from a lightweight plastic and are buoyant in water allowing them to float on the top surface and counteract any tendency of wet flies attached thereto to sink to the bottom. Additionally, some embodiments of the connector are brightly colored providing a visual queue as to the location of the connector, and by association, the fly in the water.

As can be appreciated, the connector system can also be used with other types of fishing rigs as may be appropriate, such as facilitating quicker switching between different lures at the end of a traditional rod and reel.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive, rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

Unless otherwise indicated or dictated by context, the terms "approximately" and "about" mean+−20%. Unless otherwise indicated or dictated by context, the term "substantially" means +−10%. The term "generally" means for the most part.

Unless otherwise indicated or dictated by context, the term "unitary" refers to a single item or piece not formed from the joining of several distinct items or pieces. "Unitarily formed" means the described item or piece was formed in a single operation, such as molding or 3D printing, and did not require additional operations adding additional pieces to create the final item.

An Embodiment of a Fishing Line Connector System

Figure 2:
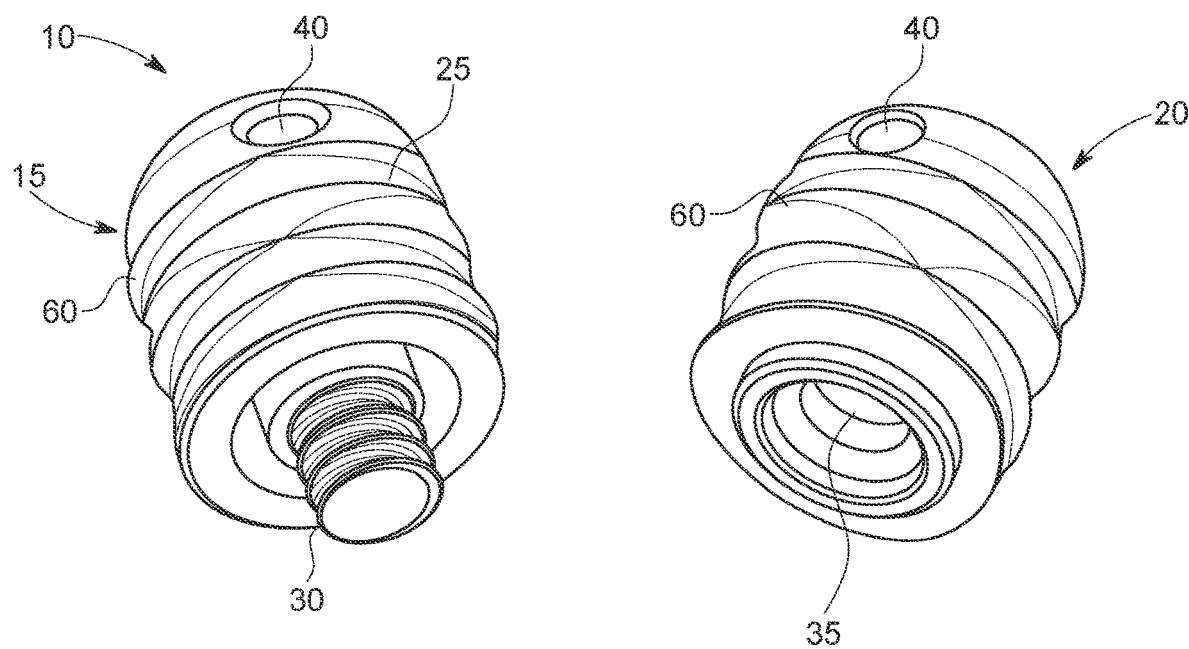
FIG. 2 is perspective view of the fly-fishing line connector with the halves of the connector disconnected according to the embodiment of the present invention.
Figure 3:
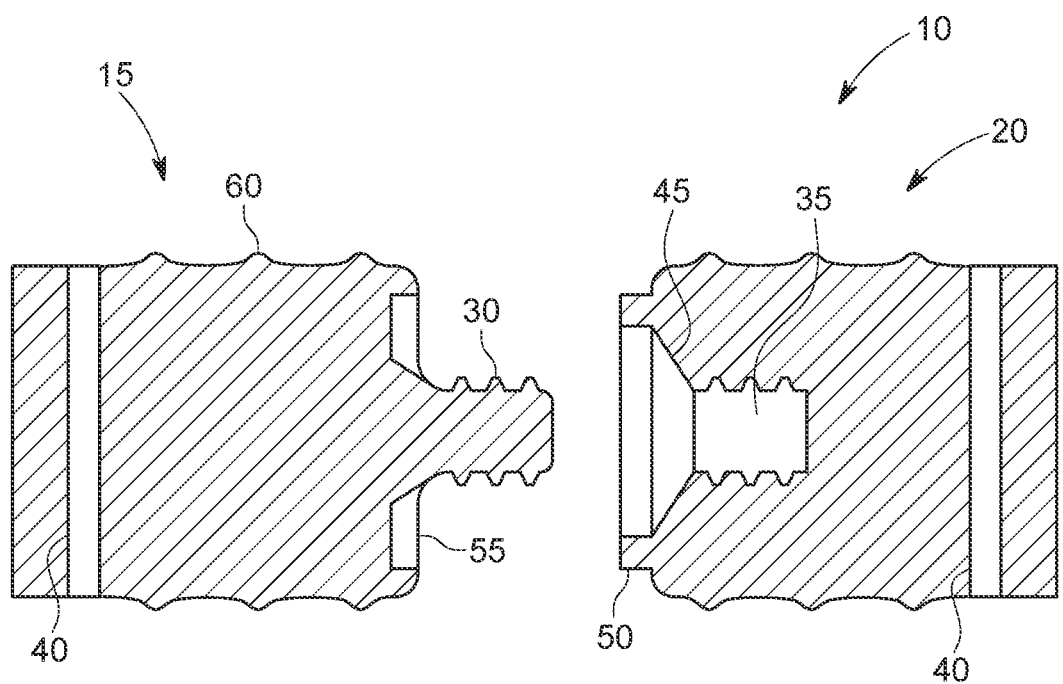
FIG. 3 is a cross sectional view of the fly-fishing line connector showing the halves aligned but not joined according to the embodiment of the present invention.

FIGS. 1-3 show an embodiment of the fishing line connector system 10. The system comprises generally cylindrical left and right halves 15 & 20 (also referred to as male and female halves) that can be releasably coupled by way of a threaded shaft 30 protruding from a coupling end of the left half 15 and a corresponding threaded coupling bore 35 extending inwardly from a coupling end of the right half 20. By turning the halves 1.5-4 rotations relative to each other the halves can be either securely coupled or separated.

With reference primarily to FIG. 3, the top of the threaded coupling bore 35 extends inwardly from a raised arcuate ridge 50 that has a significantly greater diameter than the threaded shaft 30. The top of the bore includes frustoconical portion 45 that tapers inwardly until having a diameter corresponding to the shaft diameter with the remainder of the bore is threaded. The frustoconical portion with its larger diameter near the top helps guide the threaded shaft into the threaded portion of the coupling bore and to ensure easy and quick alignment. This can be especially helpful for a person who has difficultly with his/her fine motor skill and/or suffers from hand tremors.

To help facilitate the coupling and uncoupling of the halves 15 & 20, the connector 10 has a relatively large diameter, about 10-15 mm, and sufficient length, about 25-40 mm, allowing most people to easily grasp and manipulate it. Further, the cylindrical surfaces 25 of the halves are textured to permit a person to turn them even when the connector is wet. The textured of the surface can vary but as shown comprises a plurality of circumferentially-extending diamond shaped ridges.

Proximate the distal ends of each half 15 & 20 radially extending fishing line bores 90 or eyelets are provided through which fishing line, such as tippet line and leader line can be passed and tied to secure the respective half to a line. In one embodiment, the bores are about 1.5-2.0 mm in diameter. Usually, unless necessitated by a broken line while fishing, the connector halves are tied to the respective fishing lines prior to heading to a lake or stream.

The connector system 10 is typically comprised of a lightweight polymeric material configured to be buoyant on water. A connector system, which is about 11.4 mm in diameter and about 34 mm in length, weighs about 1.7 grams. The lightweight minimizes the effect the connector system has on casting permitting an angler to cast his/her line in substantially the same manner as when a connector system is not utilized. The buoyancy permits the connector system to act as a float helping prevent the fly or other lure couple to the end of a tippet from sinking more than the tippet's length thereby keeping the fly proximate the surface of the water. Further, a dry fly is not pulled under by the buoyant connector system.

In at least one embodiment, the connector system 10 is comprised of a nylon polymer with each half 15 & 20 being unitarily molded or 3D printed. The dimensions of the connector stud 30 (about 4-5 mm in diameter) and strength of the material result in a connector system easily capable of withstanding loads in excess of 10 pounds typically exceeding the strength of the fishing line to which it is attached. Embodiments of the connector system comprise a brightly colored exterior that contrasts with the typically surroundings in use. In at least one embodiment, the color is international orange. The surface color can comprise a finish applied to the halves after fabrication or can comprise the color of the polymeric stock used to fabricate the halves. The buoyant nature of the connector system combined with its bright color provides an angular with an easily visible indication as to the location of the connector on the water, and by association, the location of the fly.

As can be appreciated, the dimensions, material, and connecting mechanism elements described and illustrated herein are merely exemplary, and numerous variations and other embodiments are possible. For instance, the threaded screw-type connector elements can be replaced with other suitable types including but not limited to a cam-type locking system or a key and keyway type locking system. While one or more variations of nylon is desirable material for fabricating the connector halves, other suitable materials include other thermoset and thermoplastic polymers. Other variations may be comprised of other suitable materials as well including but not limited to ceramics, such as porcelain, wood and metal. While the use of a polymeric or other material having a density less than that of water is desirable, the connector can be constructed, such as molded, to incorporate porosity or air pockets into the connector halves 15 & 20 to lower the overall density of the finished connector to less than 1 even if a denser material is used in the connector's fabrication. The dimensions may also vary from those specifically disclosed herein. Variations of the connector system can be used with traditional casting rod set-ups that often utilize higher test fishing line and heavier lures. To accommodate these differences, larger connectors having greater buoyancy may be desirable.

A Fishing Rod Combined with an Embodiment of the Fishing Line Connector System

Figure 4:
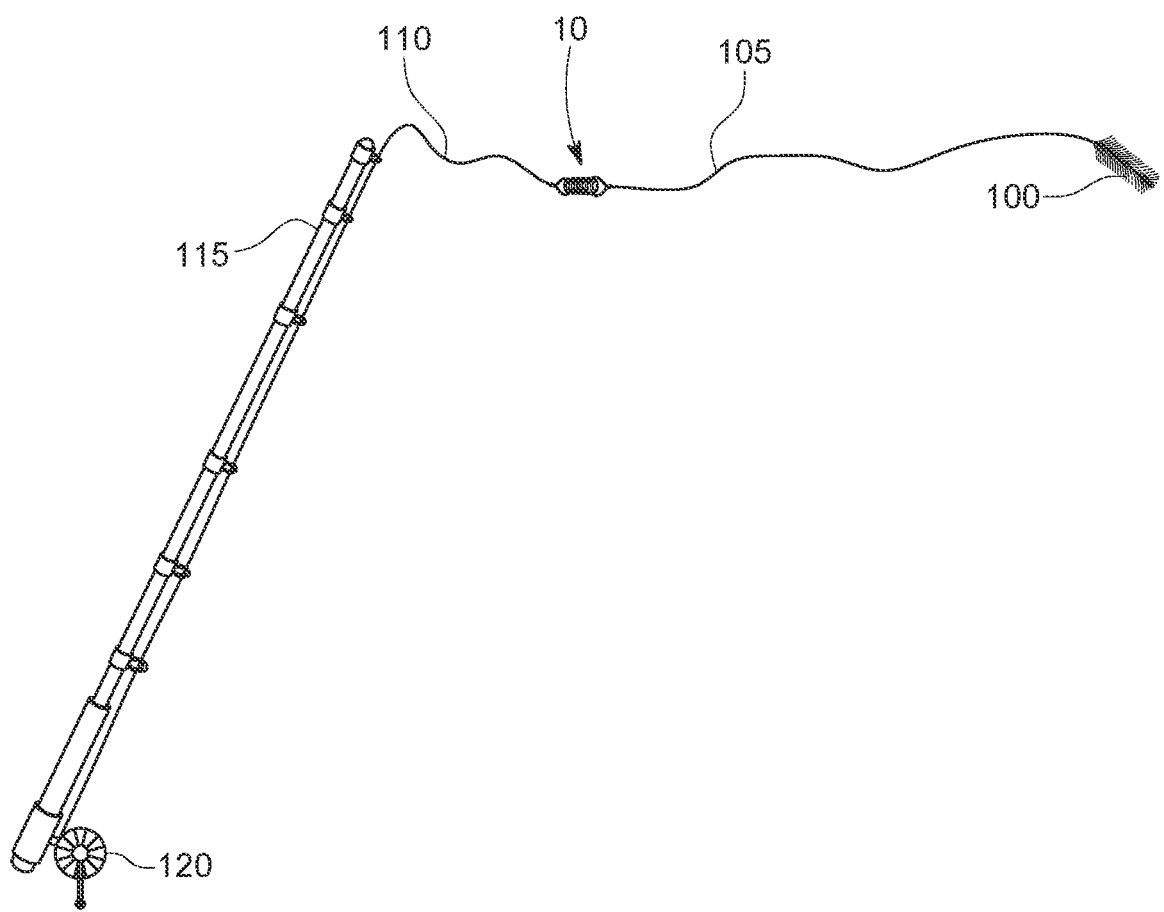
FIG. 4 is an illustration of a fly-fishing rig comprising a fly tied to one end of a tippet, one half of the line connector tied to the other end of the tippet, the other half of the line connector coupled to the one half, a leader with an end tied to the other half, and a fishing rod receiving the leader therein according to an embodiment of the present invention.

FIG. 4 is an illustration of an embodiment of the fishing line connector system 10 integrated with a fly-fishing rod. The combination includes a fishing pole 115, a reel 120, fishing line including the leader line 110, the connector system 10, the tippet 105, and a fly 100. All the components of the rod are configured as is known in the art except instead of the tippet line being tied to the end of the leader line, the corresponding ends of each are tied to a half 15 & 20 of the connector. Accordingly, when the halves are joined, the tippet is coupled to the leader. Of significance, an angler may vary the length of the tippet from the fly to the connector half as desired. For instance, if fishing in particularly shallow water, he/she may use a short tippet, and where the water is fairly deep or he/she desires to have the connector located a greater distance from the fly as to not potentially spook a fish, a longer tippet may be used.

Figure 5:
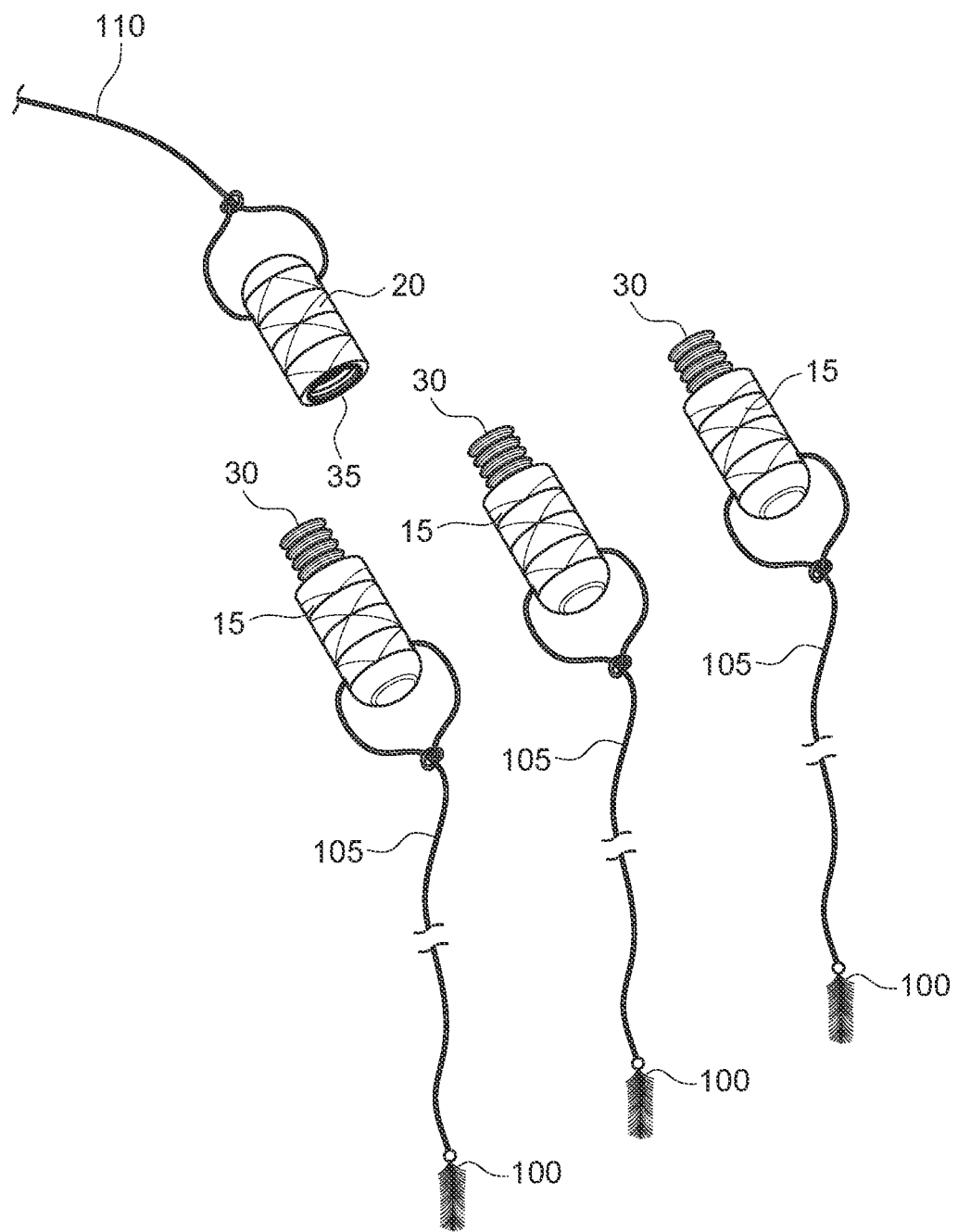
FIG. 5 is an illustration of the fishing-line connector system comprising one female half shown tied to a leader line, and a plurality of male halves each tied to a tippet line wherein each tippet line has a different fly tied to it according to an embodiment of the present invention.

As indicated above, the appropriate halves 15 & 20 of the connector system 10 are typically pre-tied to the leader 110 and the tippet 105 prior to embarking on a fishing expedition. As illustrated in FIG. 5, an angler may have a plurality of flies 100 with each tied to its own tippet 105 and each tippet tied to a connector male half 15 on the other end. The leader line 110 may have a corresponding female half 20 tied to it that can receive and attach to anyone of the fly-configured male halves 15.

Methods of Using the Fishing Line Connector System

As mentioned above, one of the primary advantages of the connector system 10 is that it permits anglers to perform the tying of fishing line to flies or other lures in a more controlled environment than when in the field or on the water. For instance, an angler who suffers from hand tremors and/or nearsightedness can attach his/her flies to the tippets and the tippets to halves of the fishing line connector at home at a desk where there is no wind, the lighting is controlled and he/she may have a magnifier.

In one variation, the fishing line connector system is sold with one half type, such as the female half 20, and multiple corresponding other halves, such as male halves 15. Accordingly, an angler in prepping for a day on the water can prepare his rod by attaching the one half to the end of the rod's leader, and attached the several corresponding other halves to their own tippets and flies. Any length of tippet desired by the angler can be used.

To prepare to fish, the angler connects the half tied to the leader to a corresponding half attached to a desired fly 100 by way of a tippet 105. As pertaining to the specific embodiments described herein, the threaded protrusion of the male half 15 is screwed into the threaded bore of the female half 20.

Once connected the angler can fish in any manner desired. Of important note, because of the lightweight of the connector 10, the angler can cast his/her fly 100 in the traditional manner without concern that the weight of the connector will negatively impede the casting process.

When the fly 100 and associated line 105, 110 are laid on the water, the connector 10 floats effectively preventing a wet fly from sinking any more than the length of the tippet being used. Also, when a dry fly is used, the floating connector does not act to pull the dry fly under as would be the case in a connector that has a greater density than the water. The floating connector especially when finished in a bright contrasting color and used with a fairly short tippet provides a good indicator of the fly's general location on the water. Further, the connector can provide the angler with a visual indication that a fish has hit or is in the process of hitting the fly.

If the angler desires to switch flies, he/she need only reel the fly 100 in, unscrew the connector halves 15 & 20 and screw in a new half sporting the desired new fly. Because of the relatively large diameter of the connector and the surface pattern formed thereon, an angler can easily screw and unscrew the halves even if wet and even if the angler suffers from dexterity issues, such as hand tremors. Once the new fly is attached the angler can resuming fishing.

OTHER EMBODIMENTS AND VARIATIONS

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A fishing line connector system comprising:
a unitarily-fabricated first half with a first connector element and a first fishing line bore, the first half having an undulating surface texture, and being at least 10 mm in width, buoyant in water, and having a bright color; and
a unitarily-fabricated second half with a second connector element and a second fishing line bore, the second connector element configured to releasably join with the first connector element, the second half having an undulating surface texture, and being at least 10 mm in width, buoyant in water, and having the bright color;
wherein the fishing line connector system weighs less than 2.0 grams.

2. The fishing line connector of claim 1, wherein the first connector element comprises an axial threaded bore, and the second connector element comprises a corresponding axial threaded stud.

3. The fishing line connector of claim 1, wherein the first and second halves are generally cylindrical with a diameter of at least 10 mm.

4. The fishing line connector of claim 1, wherein the first and second halves consist essentially of a polymeric material.

5. The fishing line connector of claim 4, wherein the polymeric material is nylon.

6. The fishing line connector of claim 1, wherein when the first and second halves are joined by the first and second connector elements, the connection is capable of holding at a 10 pound load.

7. The fishing line connector of claim 1, wherein the surface texture comprises a plurality of circumferentially extending diamond shaped ridges.

8. The fishing line connector of claim 1, wherein the bright color is international orange.

9. The fishing line connector of claim 1, wherein the length of the halves when joined is at least 25 mm.

10. In combination, the fishing line connector of claim 1, wherein the first and second halves are joined, a fishing rod including a reel and fishing line with a fishing line end of the fishing line threaded through the first fishing line bore and tied to the first half, a first fly, and a first tippet with the first tippet having a tippet first end tied to the second fishing line bore and a tippet second end tied to the first fly.

11. The combination of claim 10, including a plurality of additional second halves, each additional second half having another tippet and another fly attached thereto.

12. A method of fishing using the combination of claim 11, the method comprising:
casting the connector and fly into a body of water using the fishing rod;
observing the connector floating on the body of water;
retrieving the connector and fly from the body of water;
decoupling the first and second halves;
while near or in the body of water, selecting an additional second half from the plurality of second halves;
coupling the additional second half to the first half; and
casting a first other fly and joined first half and additional second half into the body of water.

13. The method of fishing of claim 12, wherein said decoupling and coupling comprises unscrewing and screwing the respective halves.

14. The method of claim 12, further comprising:
retrieving the joined first half and additional second half and the other fly from the body of water;
decoupling the first half and the additional second half;
while near or in the body of water, selecting yet another additional second half from the plurality of second halves;
coupling the yet another additional second half to the first half; and
casting a second other fly and joined first half and additional second half into the body of water.

15. A fishing line connector system comprising:
a unitarily-fabricated generally cylindrical first half comprised of a polymeric material with an axial threaded bore and a first fishing line bore, the first half having an undulating surface texture, and being at least 10 mm in diameter, buoyant in water, and having a bright color; and
a unitarily-fabricated generally cylindrical second half a corresponding axial threaded stud with an axial threaded stud configured to interface with the axial threaded bore and a second fishing line bore, the second connector element configured to releasably join with the first connector element, the second half having an undulating surface texture, and being at least 10 mm in diameter, buoyant in water, and having the bright color;

wherein the fishing line connector system weighs less than 2.0 grams.

16. The fishing line connector of claim 15, wherein the bright color is international orange.

17. The fishing line connector of claim 15, wherein the polymeric material is nylon.

18. The fishing line connector of claim 15, wherein the surface texture comprises a plurality of circumferentially extending diamond shaped ridges.

19. The fishing line connector of claim 15, wherein the length of the connector when the first and second halves are joined is at least 25 mm.

20. In combination, the fishing line connector of claim 15, wherein the first and second halves are joined, a fishing rod including a reel and fishing line with a fishing line end of the fishing line threaded through the first fishing line bore and tied to the first half, a first fly, and a first tippet with the first tippet having a tippet first end tied to the second fishing line bore and a tippet second end tied to the first fly.

* * * * *